March 16, 1943.  A. S. T. LAGAARD  2,313,949
DOUGHNUT MACHINE
Filed Jan. 27, 1941  6 Sheets-Sheet 1

Fig.1

Inventor
Alexander S.T. Lagaard
By Caswell & Lagaard
Attorneys

Fig. 3

Inventor
Alexander S. T. Lagaard

Patented Mar. 16, 1943

2,313,949

UNITED STATES PATENT OFFICE 2,313,949

DOUGHNUT MACHINE

Alexander S. T. Lagaard, Minneapolis, Minn., assignor to Dough-King, Inc., Minneapolis, Minn., a corporation of Minnesota Application January 27, 1941, Serial No. 376,135

11 Claims. (Cl. 107—14)

My invention relates to doughnut machines and has for an object to provide a doughnut machine which will be extremely practical in use.

Another object of the invention resides in providing a doughnut machine having a dough cutter adapted to accurately sever definite amounts of dough.

An object of the invention resides in providing a dough cutter by means of which the dough formations are maintained in proper form during deposit in the cooking kettle.

A still further object of the invention resides in providing a doughnut machine having a dough cutter which quickly releases the dough formations into the cooking liquid.

A feature of the invention resides in providing a dough cutter having a movable cutting element, together with means for forcing the dough through the cutter and in providing mechanism for rapidly moving the movable element of the dough cutter from one position to the other.

A feature of the invention resides in providing an operating mechanism for operating the dough cutter and in providing resilient means operating in conjunction with the dough cutter for causing the mechanism to rapidly operate the cutter.

Another object of the invention resides in providing cam means and a pair of cam followers for cooperation with the cam means, each of said followers being urged into engagement with the cam means by said resilient means.

An object of the invention resides in providing means for transferring control of the cutter from one cam follower to the other.

Another object of the invention resides in providing a construction for removably supporting the dough cutter so as to give access thereto.

Other objects of the invention reside in the novel combination and arrangement of parts and in the details of construction hereinafter illustrated and/or described.

In the construction of dough cutters for doughnut machines using a tubular duct having a discharge outlet and a sleeve valve member, or its equivalent cooperating therewith for severing the dough extrusions and controlling the extrusion of dough through the outlet, the customary practice has been to employ a cam and a cam follower for operating the sleeve. In such construction the cam has to climb the cam surface in moving from one of its positions to the other. Due to the fact that the slope of the cam has to be limited, an appreciable length of time is required for both opening and closing of the valve member. In the instant invention the cam follower is urged into engagement with the cam surface by resilient means which permits of constructing the cam surface with an abrupt break or irregularity in the same, which the cam follower follows so as to procure rapid operation of the dough cutter. In the instant invention this principal is utilized, both in connection with the movement of the valve member to opening position as well as to closing position, so as to permit of substantially equal extrusion of the dough for each cycle of operation of the dough cutter.

In the drawings I have shown a doughnut machine A which consists of a case 10 constructed with end walls 11 and 12, and side walls 13 and 14 connected therewith. The case includes uprights 15 and 16 at the corners of the case which extend throughout the height of the case and to which the various walls are attached. The walls are preferably constructed of sheet metal and are directly secured to the uprights 15 and 16. The case 10 further includes upper and lower frames 17 which are channel-shaped in cross section, and which extend perimetrically about the case and to which the uprights 15 and 16 are attached. The walls of the case are also attached to these frames.

Within the case 10 is disposed a cooking kettle 18 which is preferably of cast metal and which is constructed with a bottom 19 and with vertical walls 21 extending upwardly therefrom. The vertical walls are connected at their upper ends with upper walls 22 and the various walls and bottom are so arranged as to form a channel 23 which extends throughout the major portion of the kettle and which provides a way along which the doughnuts may travel. The kettle 18 has one corner of the same removed, as designated at 24, leaving a main portion 25 of the width of the case 10 and of a length equal to about two-thirds of the length of the same. This construction provides an extension 26 to the kettle which extends up to the end wall 12. The kettle 18 is constructed with a ledge 27 extending about the margin of the same which terminates in a lip 28 projecting upwardly from the extreme edge thereof. A guard 29 on the case 10 issues inwardly from the walls thereof and overlies the lip 28 thereby protecting the same and at the same time being spaced therefrom to retard transmission of heat from the kettle to the case. This guard is attached to the upper frame 17. The kettle 18 is supported on the frame 17 through supporting blocks 31 which are situated at spaced intervals throughout the length of the kettle and which rest directly upon said frame.

The channel 23 of kettle 18 is arranged to provide a straight run 32 which starts in close proximity to wall 12 and follows along wall 13. Channel 23 at the end of the run 32, makes a curve 33 which leads into another straight run 34 following along the wall 11. At the end of this run the channel has another curve 35 which leads into still another straight run 36, which follows along the wall 14. At the end of the run 36 the channel is constructed with a loop 37 which is connected to another straight run 38. Run 38 extends obliquely of the kettle and terminates in a curve 39 which, in turn, is connected to a short straight run 41 parallel with the run 34 and closely positioned relative thereto. This run is connected to a curve 42 which, in turn, is connected to a straight run 43 parallel with the run 32 and disposed in close proximity thereto. The run 43 discharges into a reservoir 44 which is merely an enlargement of said run. In this reservoir a short run 45 is provided which is connected by a curve 46 with the end of the run 32.

The major portion 25 of kettle 18 is enclosed by means of a hood 47. This hood utilizes the uprights 15 at the end wall 11 and two other uprights 48 which are attached to the case 10 at the locality of the end of the major portion 25 of the kettle formed by the corner 24. Between the various uprights are provided glass panels 49 which are slidably supported in guides 51 whereby the said panels may be removed. Hood 47 includes a top by means of which the major portion 25 of the kettle is enclosed and which has not been shown in the drawings.

In the reservoir 44 is provided a vertical tubular duct 52 which communicates at its lower end with the bottom of the reservoir 44. In this duct is disposed an impeller or elevator 53 which is mounted on the armature shaft of a motor 54. The duct 52 communicates at its upper end with the run 45 of channel 23, thus discharging the cooking liquid from the reservoir 44 and into the run 45 of the channel from which it flows throughout the runs of the channel and is returned into the reservoir 44.

At the portion of the frame 10, adjacent wall 12, is provided a channel member 55 which rests upon the upper frame 17. This channel member is constructed with one reach 57 which follows along the portion of the frame 17 to which the side wall 13 is attached and with another reach designated by the reference numeral 56 which follows along the portion of the frame 17 to which the end wall 12 is attached. The former reach 57 terminates at the upright 48, while the latter reach 56 terminates at a locality in proximity to the wall of the kettle defined by the corner 24 of the same.

This channel member is rigidly secured to the frame 17 by bolts 58. Attached to the uppermost portion of the channel member 55 is a plate 59 constructed of heavy sheet material which forms a table on which portions of the mechanism of the doughnut machine rests. The table 59 has an opening 60 in it adapted to be closed by the motor 54 and through which the impeller 53 may be inserted into the tubular duct 52.

In the table 59 is formed another opening 61 which is situated above the run 32 of channel 23 and at the beginning of the same. A portion of the dough cutter extends through this opening, as will be hereinafter more fully described.

Attached to the table 59, on either side of the opening 61, are two bosses 62 which are secured thereto by means of screws 63 extending through the table and screwed into the said bosses. These bosses have bores 64 formed in the upper ends of the same and are threaded to receive thumb screws 65. Detachably secured to the bosses 62 is a support 73 for a dough receptacle 66 which will be presently described in detail. The support 73 includes a collar 74 having two legs 75 extending downwardly therefrom. These legs are spaced apart the same distance as the bosses 62 and rest upon the same. The legs 75 have dowel pins 76 issuing from the undersides thereof which are received in the bores 64 of the said bosses. The set screws 65 are adapted to engage grooves 77 in the said dowel pins whereby the said pins are held from movement. In this manner the support 73 is rigidly attached to the bosses 62 and table 59. It will be noted that the two legs 75 and the bosses 62 straddle the opening 61 in the table 59.

The dough receptacle 66 comprises a cylindrical wall 67 and a hopper-shaped bottom 68 connected thereto. The upper end of the receptacle 66 is open and is provided with a flange 69 encircling the same. At the center of the hopper-shaped bottom is provided a tapered tubular neck 71 which is adapted to fit into a conical socket 72 formed in the collar 74 of support 73. The upper end of the receptacle is closed by means of a cover 78 which makes a fluid-tight connection with the flange 69 of the receptacle by means of a gasket 79. The cover 78 is held in position by means of a clamp 81, having hooks 82 which extend under and engage the underside of the flange 69. A screw 83 threaded into the clamp 81 engages the cover 78 and forces the said cover downwardly to procure a fluid-tight connection between the cover and receptacle. This screw has attached to it a handle or knob 84 by means of which the same may be easily rotated.

Figure 2:
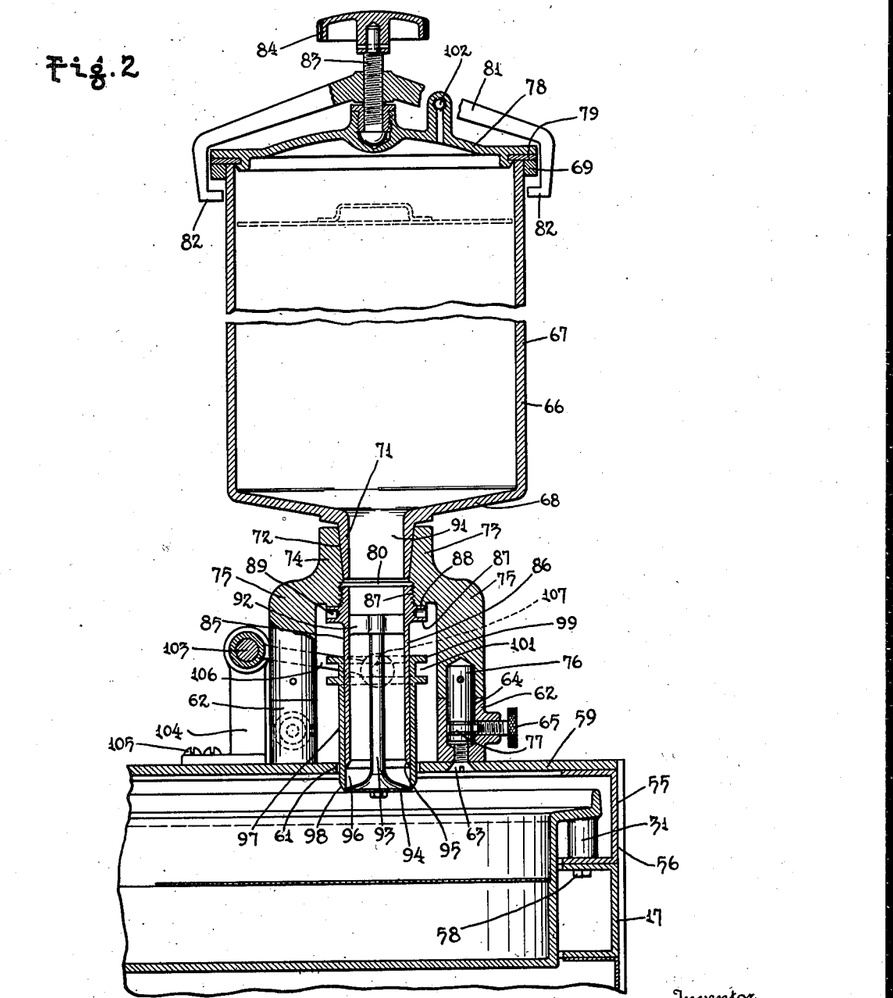
Fig. 2 is an elevational sectional view taken on line 2—2 of Fig. 1 and drawn to a greater scale.

The dough cutter of the invention is indicated in its entirety by the reference numeral 85. This cutter comprises a tubular duct 86 which is formed at one end with threads 87 adapted to screw into threads 88 formed in the collar 74 of the support 73. The duct 86 has a collar 87 on the same which fits up against a shoulder 88 on the underside of the collar 74. Holes 89 in the said collar for engagement with a spanner wrench serve to rotate the duct 86 and to attach and remove the same from the support 73. When the duct 86 and the receptacle 66 are mounted as shown in Fig. 2, a passageway 91 is provided leading from the receptacle 66 and through the said duct and communicating with the exterior through the open end of the said duct.

Extending across the interior of the duct 86, near the upper end thereof, is a bridge 92. This bridge has attached to it a stem 93 which has secured to the lower end thereof a disc-like die head 94. This head is of substantially the same diameter as the outer diameter of the duct 86 and is disposed below the lower edge 95 of the said duct to form an outlet 96 for the passageway 91. The lower edge 95 of the said duct is beveled, as indicated in Fig. 2, to readily direct the dough outwardly through the outlet 96 without appreciable friction.

Slidably mounted upon the exterior of the duct 86 is a sleeve 97 which serves as a valve member for opening and closing outlet 96. This sleeve has a tapered end 98 which is adapted to engage the die-head 94. When the sleeve is in the position shown in Fig. 2 the outlet 96 is closed and dough prevented from being extruded from the cutter. When the sleeve is raised so that the end 98 thereof recedes from the head 94, dough is caused to flow outwardly through the outlet 96 in annular formation. When the sleeve 97 is thereafter lowered the end 98 thereof severs the dough so extruded and discharges the same into the cooking liquid below the cutter. The sleeve 97 has a collar 99 on the upper portion thereof which is constructed with a groove 101 by means of which the said sleeve may be reciprocated along the duct 85. In order to force the dough out of the outlet 96 compressed air is directed into the upper end of the receptacle 66 through an air inlet 102. A compressor or any other suitable source of compressed air may be used for furnishing the air to the receptacle.

Figure 1:
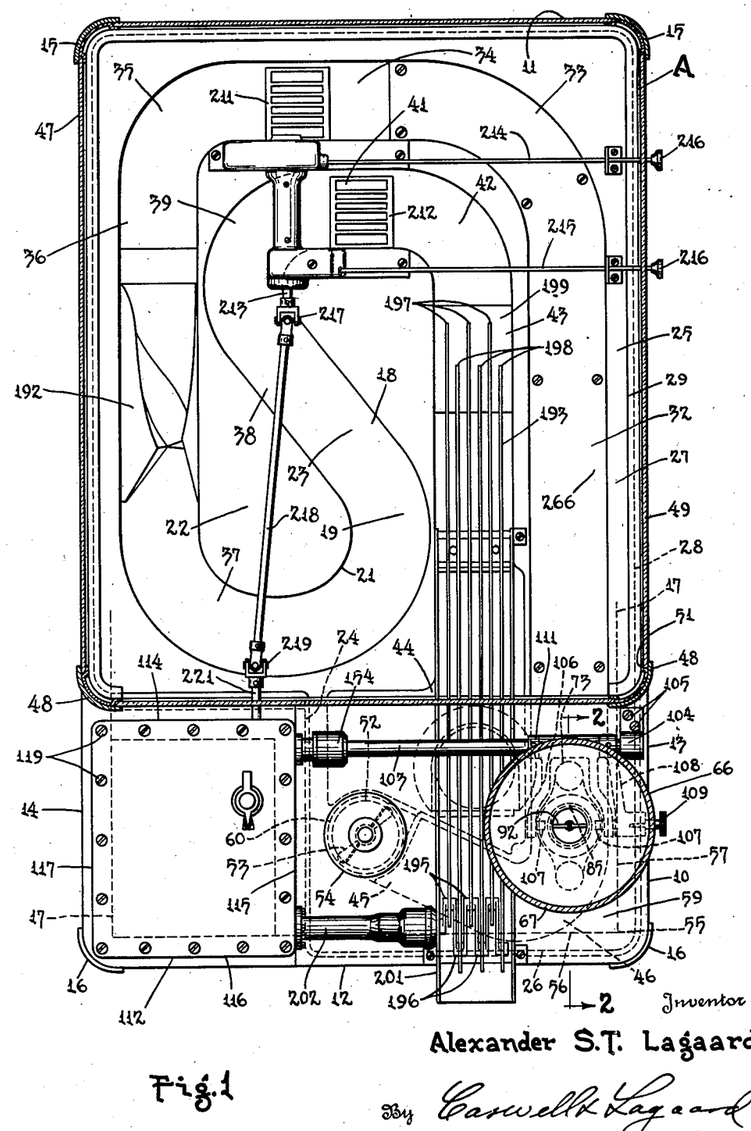
Fig. 1 is a plan view of a doughnut machine illustrating an embodiment of my invention.

The sleeve 97 of cutter 85 is reciprocated by means of a rock shaft 103 which is mounted for oscillation in a bearing 104 secured to the table 59 by means of screws 105. This bearing supports the outer end of the said shaft. The inner end of the shaft is supported for oscillation in a manner to be presently described. The rock shaft 103 has loosely mounted on it a fork 106, best shown in Fig. 1. This fork has pins 107 on the ends thereof which are received in the groove 101 of sleeve 97. Rigidly secured on the rock shaft 103, outwardly of the fork 106, is an arm 108 which has mounted in it a lock pin 109. The lock pin 109 is adapted to be moved into engagement with the fork 106 and, when so positioned, procures movement of the fork with the arm upon oscillation of rock shaft 103. The arm 108 holds the fork 106 from endwise movement in one direction. A collar 111 on rock shaft 103 and positioned adjacent the fork 106 on the other end of the same holds the said fork from movement in the opposite direction.

The rock shaft 103 is driven by a transmission which is contained within a case 112 resting upon the upper frame 17 and disposed in the corner 24 of kettle 16. This case and the transmission within the same is best shown in Figs. 3 to 7 inclusive. The case 112 includes a lateral wall structure 113 having four walls 114, 115, 116 and 117 and being open at the top and bottom. These walls are closed at the top by a cover 118 which is secured to the said walls by means of countersunk screws 119 threaded into bosses 121 formed on said walls. In a similar manner a closure or bottom 122 is provided for the lowermost portion of the case 112, which bottom is attached to the wall structure 113 by means of screws 123 which are threaded into bosses 124 formed on the wall structure 113. The case 112 is provided with pads 125 formed on the bottom 122, which pads rest upon the upper frame 17 and are secured thereto by means of screws 126. These screws pass through the uppermost flanges of the frame members of frame 17 and are threaded into said pads.

The bottom 122 of case 112 has attached to the underside thereof an electric motor 127 having a vertical shaft 128. Motor 127 is constructed with an end bell 129 provided with a flange 131 adapted to engage a ring 132 cast on the underside of the bottom 122. Screws 133 extending through the flange 131 are threaded into the ring 132 and hold the motor 127 attached to the bottom 122. Motor 127 may be of any desirable construction and the details thereof have not been shown in the drawings. The shaft 128 of the motor 127 passes through a seal 134 and into the chamber 135 formed within the interior of the case 112.

Issuing from the wall 116 of case 112 are two bearing supports 136 and 137. The bearing support 136 has attached to it a bearing 138 for the lower end of a vertically extending shaft 139. This shaft is journaled in its upper end in a ball bearing 141 which serves as an end thrust bearing for restraining longitudinal movement of the shaft 139. This bearing is mounted in the bearing support 137. Shaft 139 has secured to the lower end thereof a spur gear 142 which meshes with a pinion 143 fast on the shaft 128 of motor 127. Shaft 139 has formed on it a worm 144 which meshes with a worm wheel 145 keyed to a horizontally extending shaft 146. Shaft 146 extends completely across the case and is journaled in bearings 147 and 148 formed on the walls 117 and 115 of said case. Within the chamber 135 of case 112 is mounted a rock shaft 151 which is parallel with the shaft 146. This rock shaft is journaled for rotation in two bearings 152 and 153 formed in the walls 117 and 115 of case 112. The said shaft is in alignment with the rock shaft 103 and is coupled to it by means of a coupling 154. The inner end of the shaft 103 is thus journaled through the bearing 153 for shaft 151. The shaft 151 has rigidly secured to it an arm 155 which carries a roller 156. The shaft 151 is rocked by means of a construction now to be described which engages the roller 156 and swings the shaft 151 first in one direction and then in the opposite direction to procure proper operation of the dough cutter 85.

Mounted on the shaft 146 in close proximity to one another are two cams 157 and 158. These cams are keyed to the shaft 146 and rotate continuously with the same. These cams give motion to the roller 156 of arm 155 as will be presently explained. Issuing inwardly from the wall 116 of case 112 is a bracket 159. Two arms 161 and 162 straddle the shaft 146 and the cams 157 and 158 and have struts 163 thereon which are pivoted to the brackets 159 by means of a pintle 164 screwed to the same. The arm 161 has a cam follower 165 on it which engages the cam 158, and is free from the cam 157. The arm 162 has formed on it cam follower 166 which engages the cam 157 and is free from the cam 158. The two arms 161 and 162 are formed with spring seats 167 and 168 supporting therebetween a compression coil spring 169. This coil spring urges the cam followers 165 and 166 into engagement with the surfaces of the two cams 157 and 158.

The ends of the arms 161 and 162 opposite the spring seats 167 and 168 are formed with heads 171 and 172 which have facing surfaces 173 and 174 disposed in spaced relation to one another. These surfaces engage the roller 156 and serve to swing the arm 155 and shaft 151 in opposite directions. A compression coil spring 175 seated in one end against the head 171 and at its other end against a spring seat 176 secured to the wall 114 of case 112, urges the arm 161 to swing toward the cam 158 and the surface 174 of the head 171 toward the roller 156. A limit screw 177 screwed into the head 172 engages the head 171 and limits movement of the two heads toward one another. This screw is held in position by means of a lock nut 178.

The cam 157 is provided at diametrally opposed localities with two notches 181 and 182 having sharp drops 183. The remainder of the cam surface of this cam, indicated at 184, is circular. The cam 158 is constructed with short circular portions 185 and 186 opposite one another and with sharp drops 187 and 188 adjacent the circular portion 185 and 186. These drops and the circular portions are connected by spiraling portions 189 and 191.

Figure 5:
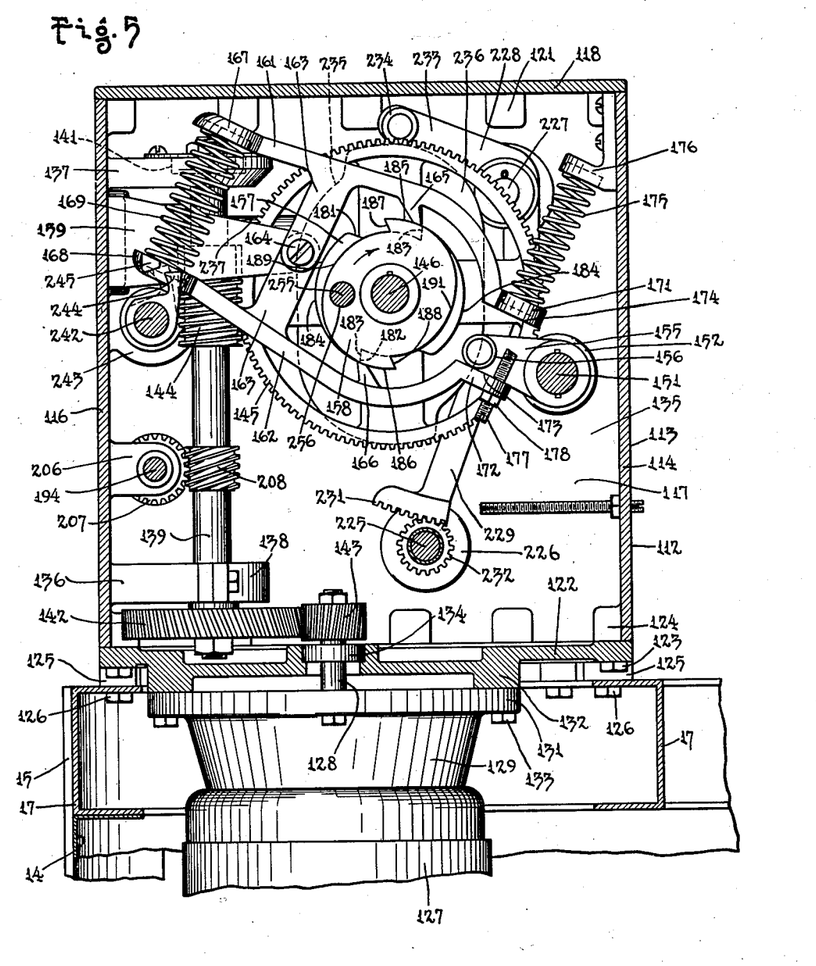
Fig. 5 is an elevational sectional view taken on line 5—5 of Fig. 3.
Figure 6:
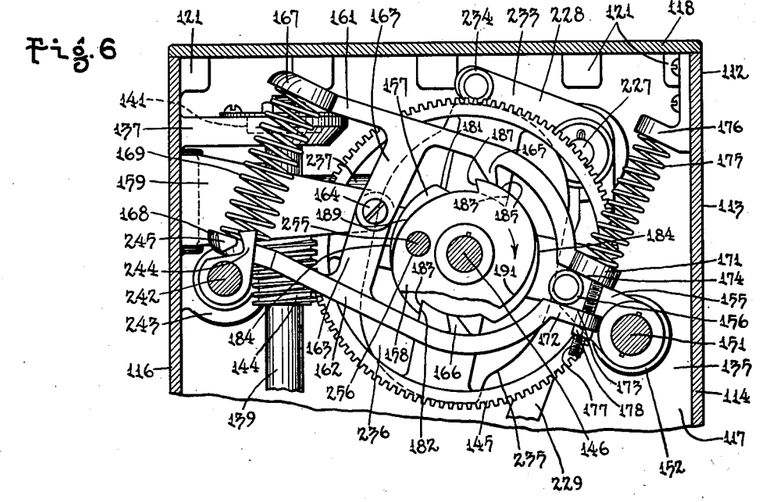
Fig. 6 is a fragmentary elevational sectional view similar to Fig. 5 showing the parts in altered positions.
Figure 7:
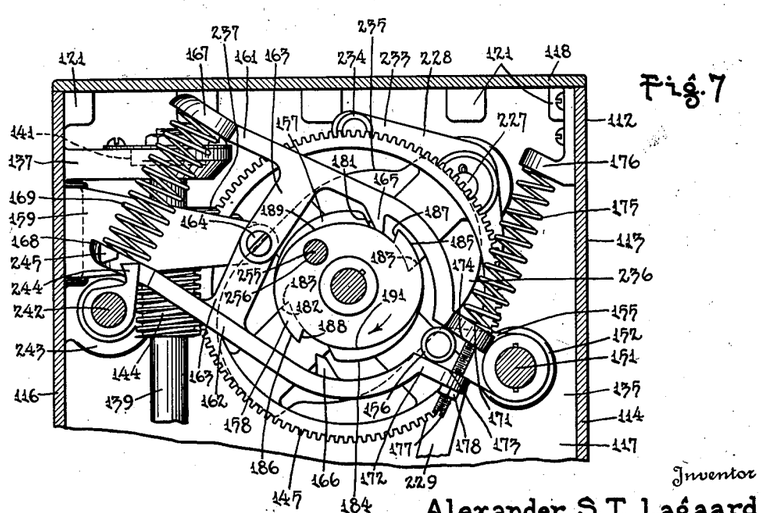
Fig. 7 is a view similar to Fig. 6 showing the parts in still different positions.

The operation of the mechanism for actuating the cutter 85 is as follows: Assuming the parts to be arranged as shown in Fig. 5. The cam follower 166 is now on the circular portion 184 of cam 157 and is about to drop into the notch 182 of said cam at the abrupt drop 183. Cam follower 165 is still riding upon the circular portion 185 of cam 158. The arm 155 is positioned as shown with the roller 156 engaging the surface 173 of head 172. In this position the cutter sleeve 97 is in its lowermost position as shown in Fig. 2 and the cutter is closed. As soon as the shaft 146 has rotated a slight amount in the direction indicated by the arrow, cam follower 166 will have dropped into the notch 182. Such movement is caused by the spring 169 which urges the cam follower 166 to follow the surface of the cam 157. Such movement will be exceedingly rapid and the surface 173 of head 172 will swing the roller 156 upwardly oscillating arm 155 and shaft 151 in a clockwise direction. Such movement of the shaft will raise the cutter sleeve 97 and open the outlet 96. Due to the air pressure in the receptacle 86 dough will be extruded outwardly through the outlet 96 in annular formation, such extrusion continuing as long as sleeve 97 is in its uppermost position. In such position the roller, as shown in Fig. 6, will be in close proximity to the surface 174 of head 171 and the limit screw 177 will engage the said head. As the shaft 146 continues to rotate follower 166 continues to ride along the surface of cam 157 in the notch 182 and remains without movement. When the cam follower 165 reaches the drop 187 in cam 158, spring 175 will urge the follower to move inwardly. Inasmuch as the two arms 161 and 162 have been urged together through spring 169 until the limit screw 177 engages the head 171, the two arms now move as a unit being unaffected in their movement by spring 169, said movement being caused solely by spring 175. Such movement of the arms swings the roller 156 downwardly to the position shown in Fig. 7. On account of the limit screw 177 arm 162 is also swung downwardly to a position such that the cam follower thereof is clear of the circular portion 184 of the cam 157. To accomplish this, the cam follower 165 moves inwardly a slightly greater amount than the cam follower 166. As the shaft 146 rotates further, follower 166 is brought into a position to be engaged by the circular portion 184 of cam 157. In such a position the arm 162 is restrained from inward movement and held in place while the follower rides along such surface. During the following movement of the cams, the cam follower 165 rides along the spiraling portion 189 of the cam surface of cam 158, thus swinging the arm 161 outwardly. Arm 162 being held from movement, movement of arm 61 compresses both springs 169 and 175 at the same time. When the cam follower 165 reaches the circular portion 186 of cam 158 the mechanism is again ready to be operated. The next time the operation occurs in the diametrally opposed notches, instead of the notches originally referred to. In this manner two dough formations may be severed for each revolution of the shaft 146, the purpose of which will be subsequently described in detail.

In the run 36 of channel 23 is arranged a twisted tubular turner 192. This turner inverts the doughnuts after the same have been cooked a predetermined time so that the doughnuts may be cooked equally on both sides. Such construction being well known in the art, will not be described in detail in this application. It is to be noted, however, that the turner 192 inclines in the direction of the cooking liquid so that the bottom 19 of the kettle at the run 41 is considerably lower than the run 34.

In the run 43 of channel 23 is disposed an ejector 193 for removing the cooked doughnuts from the cooking liquid. This ejector comprises a shaft 194 which is constantly driven in a manner to be presently described. This shaft has mounted on it oppositely extending cranks 195 and 196. Sets of toothed blades 197 and 198 are mounted on the said cranks and are adapted to alternately raise and lower and also move in a longitudinal direction as the shaft 194 rotates. The lower ends of these blades slide upon an inclined rest 199 which is mounted on the bottom 19 of kettle 18 in the portion of the run 43 leading from the curve 42. It will be readily comprehended that, as the doughnuts reach the said blades, the doughnuts are elevated and progressed upwardly and outwardly of the kettle 18. The ejector 193 is disposed within a trough 201 constructed with two side plates which extend outwardly beyond the wall 12 of the case 10 and directs the doughnuts out of the machine.

The ejector 193 is driven from the shaft 139 of the transmission in the following manner: Shaft 194 of said ejector extends through a tubular housing 202 which is provided with a flange 203 at one end. This flange is secured to the wall 115 of case 112 by means of screws 204. The housing 202 is provided at its outer end with a bearing 205, which journals one end of the shaft 194. The other end of this shaft extends into the chamber 135 of case 112 and is journaled in a bearing 206 issuing outwardly from the wall 116 of case 112. The shaft 194 has mounted on it a spiral gear 207 which meshes with another spiral gear 208 formed on the shaft 139. These gears are so proportioned that the shaft 194 travels at a suitable speed to alternately raise the toothed blades 197 and 198 and procure ejection of the doughnuts.

For controlling the rate of travel of the doughnuts along the channel 23 two control devices 211 and 212 are employed. These control devices operate to allow the doughnuts, one at a time, to enter the turner 192 and the ejector 193, whereby the degree of the cooking of the doughnuts on both sides may be controlled. The control device 211 is situated in the run 34 of channel 23, while the control device 79 is situated in the run 41 of channel 23.

Inasmuch as the control devices 211 and 212 do not form any particular feature of the instant application for patent, the said devices have not been shown in detail in the drawings and the same will not be described, reference to be had to the patent issued to Alexander S. T. Lagaard for Doughnut machine, Number 2,207,546. It will be noted, however, that the control device 211 is operated by a shaft 213 and that the control device 212 is operated from the control device 211 through the same shaft. It will also be noted that each control device rocks alternately in one direction and then in the other direction to allow the doughnuts, one at a time, to pass said devices. This is accomplished by periodically oscillating the shaft 213 which is procured in a manner to be presently described in detail.

In order to procure sufficient cooking time for the doughnuts in advance of each control device, when the machine is first started, it becomes necessary to prevent travel of the doughnuts until the desired number of doughnuts are in the machine. For this purpose the two control devices 211 and 212 may be independently disconnected from or connected to the shaft 213 by clutch devices not shown which are operated by means of operating rods 214 and 215 which extend outwardly of the machine and which have knobs 216 at their outer ends.

Figure 3:
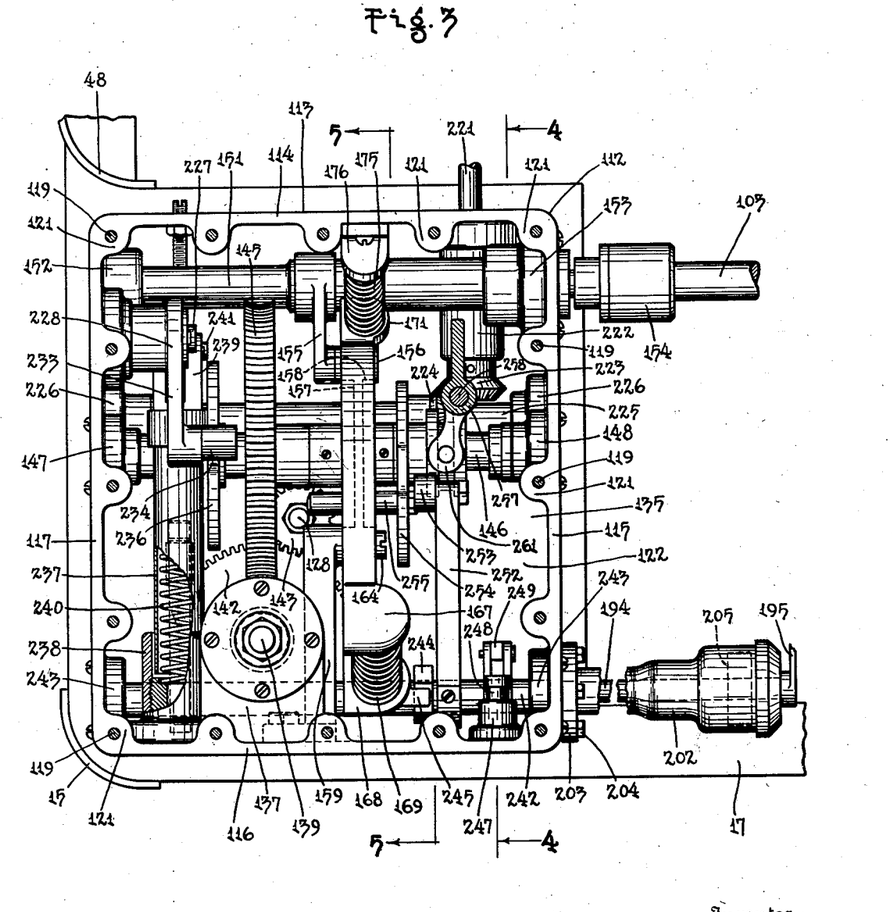
Fig. 3 is a plan sectional view of the transmission housing and transmission with the cover removed and drawn to a greater scale than Fig. 1.

The mechanism for operating the control devices 211 and 212 is best shown in Figs. 3 to 7 inclusive. Connected to the shaft 213 by means of a universal joint 217 is a floating shaft 218. This shaft is connected by means of a universal joint 219 with another shaft 221 extending through the wall 114 of case 112 and into the chamber 135. Within the chamber 135 of case 112 is formed an elongated boss 222, Figs. 3 and 4, which is provided with bearings for journaling the shaft 221. This shaft has secured to the inner end of it a bevel gear 223 which meshes with another bevel gear 224 fast on a shaft 225 extending horizontally across the case 112. The latter shaft is journaled in bearings 226 carried by side walls 117 and 115 of the case, as best shown in Fig. 3.

Figure 4:
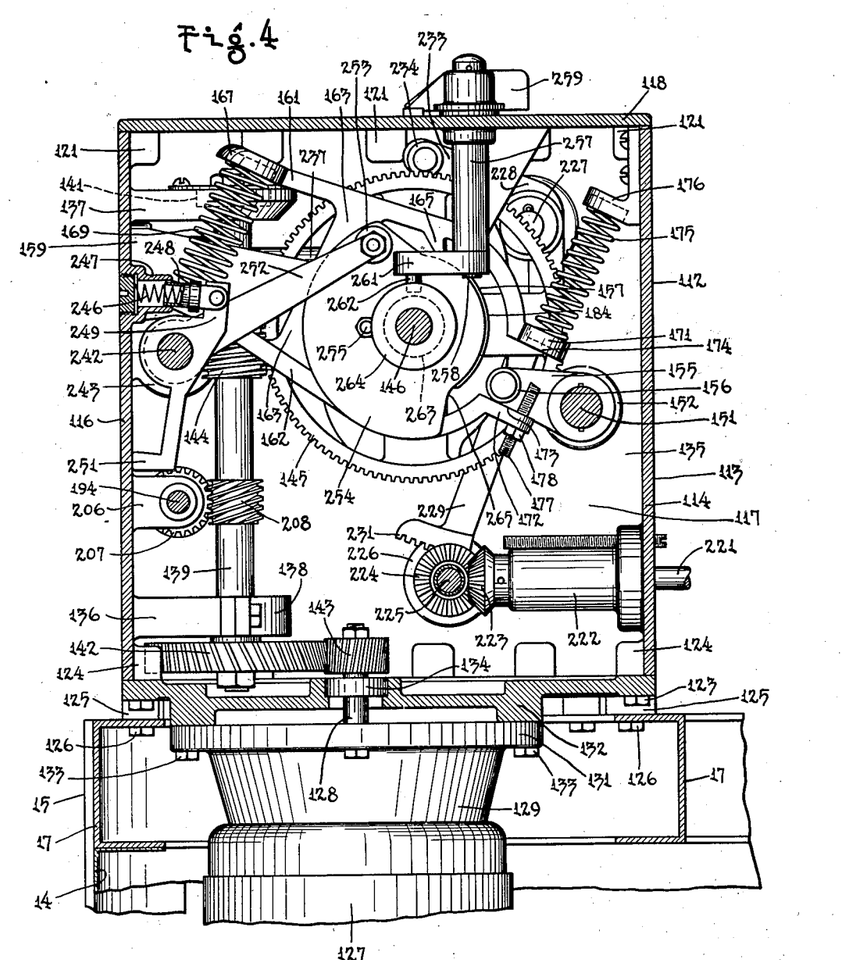
Fig. 4 is an elevational sectional view taken on line 4—4 of Fig. 3.

Attached to the wall 117 of case 112, near the uppermost portion of the same, as best shown in Figs. 3 and 4, is a stud 227. Mounted for oscillation on this stud is a lever 228 which has a depending arm 229. Arm 229 is formed with a gear segment 231 which meshes with a pinion 232 fast on the shaft 225. Lever 228 is further formed with an arm 233 which carries at the end of it a roller 234 adapted to engage the surface 235 of a disc cam 236. Cam 236 is keyed to the shaft 146 and has two depressions in it by means of which the control device may be twice operated for each revolution of the shaft 146. The roller 234 is urged against the surface 235 of cam 236 by means of a spring 240 which is contained within a spring housing 237 and which acts between the wall 116 of the case 112 and against the arm 229 of said lever. The housing 237 is slidably mounted at one end in a boss 238 formed on the wall 116 and is constructed with a fork 239 at its other end which straddles the arm 229 and is pivoted to it by means of a pin 241.

With the present invention the doughnut machine may be operated at full capacity or one-half capacity, by means of the construction now to be described.

Extending across the walls 117 and 115 of case 112 is a shaft 242. This shaft is journaled in bearings 243 formed in the case. This shaft has secured to it a finger 244, best shown in Fig. 5, which is disposed in proximity to the spring seat 168 on arm 162. The said finger is adapted to engage a lug 245 formed on the spring seat 168 when the said lever is rocked in a counter-clockwise direction, as viewed in Fig. 5. When so positioned the said arm prevents movement of the lever 162 in a manner to swing the shaft 151 in a clockwise direction. Thus the cutter sleeve 97 is maintained in a closing position preventing the extrusion of dough through the outlet 96.

The shaft 242 is urged into the position shown in Fig. 5 by means of a spring 246 which is contained in a spring housing 247 attached to the wall 116 of case 112. This spring engages a plunger 248 slidable in the housing 247 which is pivoted to an arm 249 on the shaft 242. Arm 249 has a stop 251 on it which engages the wall 116 of case 112 and limits the movement of the shaft 242 to its position shown in Fig. 5.

The shaft 242 is rocked in its bearings in the following manner: Attached to the said shaft is an arm 252 which is provided with a cam follower which is in the form of a roller 253 at the end thereof, best shown in Fig. 4. This roller is adapted to engage a cam 254, slidably mounted on the shaft 146. Cam 254 has a pin 255 secured to it which passes through holes 256 in the cams 157 and 158. By means of this construction the cam 254 is keyed relative to the shaft 146 and may move axially with respect thereto.

The cam 254 is shifted longitudinally by means of the following construction: Extending downwardly from the cover 118 of case 112 is a boss 257 which is drilled to form a bearing for a shaft 258, best shown in Fig. 4. This shaft extends outwardly beyond the cover and has secured to it a finger piece 259 by means of which the said shaft may be rotated. Shaft 258 also extends below the boss 257 and has secured to its lower end an arm 261. This arm has attached to the end of it a pin 262 which engages within a groove 263 in the hub 264 formed on cam 254. When the shaft 258 is rotated through engagement with the finger piece 259 the pin 262 shifts the hub 264 along the shaft 146. This moves the cam 254 in a position to be engaged by the roller 253 or to a position free therefrom. The cam 254 has a depression 265 in it which, when the roller 253 is opposite said depression, withdraws the finger 244 from engagement with the lug 245. This allows the cutter 85 to function in the normal manner, thus operating twice for each revolution of the shaft 146. When the roller 253 engages the raised portion of the cam 254, the cutter is restrained from movement.

For restraining movement of the control devices 211 and 212 another arm is provided on the shaft 242 which is adapted to engage a suitable lug on the spring housing 237. This construction having been illustrated in the patent issued to Stephen A. Gardner, July 9, 1940 for Doughnut machine, Number 2,207,584 and disclosed in Fig. 6 thereof the same has not been illustrated in this application. It will, however, be comprehended that, as the shaft 242 oscillates, the spring housing 237 is restrained for movement at the same time that the arm 162 is restrained from movement.

The operation of the invention generally is as follows: The channel 23 in kettle 18 is first filled with cooking liquid. This liquid is maintained at a suitable temperature for cooking by means of a heater disposed beneath the kettle and which has not been shown in the drawings. Motor 54 is then started which causes operation of the impeller 53. Circulation of the cooking liquid in the channel now commences. The motor 127 is now energized and the shaft 146 of the transmission mechanism set in operation. This procures operation of the ejector 193 and the shaft 213 for operating the control devices 211 and 212. In addition, the shaft 103 is periodically oscillated. The clutch formed by the arm 108 and the lock pin 109 is, however, maintained open so that the cutter 85 is normally inoperative. The receptacle 66 is filled with dough and air pressure applied to the same. As soon as the lock pin 109 is brought into engagement with the fork 111 the cutter operates and dough extrusions are deposited in the flowing cooking liquid in the channel 23. Operation of the cutter, as previously explained, is produced by rapid opening and closing of the sleeve 97 which causes accurate severance of dough formations of predetermined size and weight. At the outset the two clutches operated by the operating rods 214 and 215 are disconnected so that neither of the control devices 211 or 212 are functioning. As the doughnuts travel along the drop plate 266 in channel 32 the same commence to fry and become arrested when they engage the control 211. After the required number of doughnuts have been accumulated in back of the control device 211 the clutch operated by the operating rod 214 is connected and the control device 211 commences to function. This device then allows the doughnuts, one at a time, to enter and pass through the turner 192. The same procedure is adopted with the control device 212, said control device being first disconnected and subsequently actuated upon the required number of doughnuts having accumulated in back of the same. When the said control device commences to function the doughnuts are completely fried and are delivered to the ejector 193 and discharged from the device.

If the finger piece 259 is in a position such that the cam 254 is free from the roller 253, each of the irregularities in the cams 157 and 158 and in the cam 236 are operative to produce two doughnuts for each revolution of the shaft 146. If, however, the finger piece 259 is moved to its opposite position to bring the cam 254 into engagement with roller 253, the rock shaft 242 is rocked so as to bring the finger 244 into engagement with lug 245 and to similarly arrest movement of the spring housing 237. This causes the cutter and control device to remain inoperative during one-half a revolution of the shaft 146 whereby the doughnut machine operates at one-half capacity. It will be noted that, regardless of whether or not the doughnut machine is operated a full or one-half capacity, the rapidity with which the cutter shaft is oscillated for moving the cutter sleeve remains the same, thus the cutter functions equally as effectively whether the machine is being operated at full or one-half capacity.

The advantages of my invention are manifest. By means of the construction shown the cutter mechanism may be actuated independently of the flow of cooking liquid and independently of the operation of the control devices. By means of the supporting structure for the dough receptacle the receptacle may be easily removed for re-filling. In addition, the support carrying the cutter may be quickly removed from the machine so that cleaning and inspection of the parts can be conveniently accomplished. By means of the two arms having separate cam followers operating to shift the cutter shaft and by procuring movement of the cutter valve member in both directions by resilient means rapid opening and closing of the outlet is secured so that dough formations of predetermined weight and size can be readily formed.

Changes in the specific form of my invention, as herein disclosed, may be made within the scope of what is claimed without departing from the spirit of my invention.

Having described my invention, what I claim as new and desire to protect by Letters Patent is:

1. In combination, a dough cutter including a duct for dough provided with an outlet through which dough is extruded, a movable valve member for said outlet movable in one direction to open said outlet to permit of the extrusion of dough therethrough and movable in the opposite direction to sever the extruded dough and close said outlet, a revoluble member, resilient means for instantly moving said valve member in one direction, other resilient means for instantly moving said valve member in the other direction, and means operated by said revoluble member for controlling the action of both of said resilient means.

2. In combination, a dough cutter including a duct for dough provided with an outlet through which dough is extruded, a movable valve member for said outlet movable in one direction to open said outlet to permit of the extrusion of dough therethrough and movable in the opposite direction to sever the extruded dough and close said outlet, a revoluble member, resilient means for urging said valve member in one direction, a cam operated by said revoluble member for controlling the action of said resilient means, and a cam follower moved by said resilient means and controlling the movement of said valve member, said cam having a cam surface formed with an abrupt irregularity therein freeing said cam follower and procuring rapid movement of said resilient means and the movable valve member into a closing position.

3. In combination, a dough cutter including a duct for dough provided with an outlet through which dough is extruded, a movable valve member for said outlet movable in one direction to open said outlet to permit of the extrusion of dough therethrough and movable in the opposite direction to sever the extruded dough and close said outlet, a revoluble member, an arm for moving said valve member in one direction, a second arm for moving said valve member in the other direction, a cam, a cam follower engaging said cam and carried by one of said arms, resilient means for urging said cam follower into engagement with said cam, said cam having a surface formed with an abrupt irregularity releasing said cam follower to procure instant movement of said valve member in one direction, a second cam, a second cam follower engaging said second cam and carried by said second arm, resilient means for urging said second cam follower into engagement with said second cam, said second cam having an irregularity in the surface thereof releasing said second follower to procure instant movement of said valve member in the opposite direction.

4. In combination, a dough cutter including a duct for dough provided with an outlet through which dough is extruded, a movable valve member for said outlet movable in one direction to open said outlet to permit of the extrusion of dough therethrough and movable in the opposite direction to sever the extruded dough and close said outlet, a revoluble member, an arm for moving said valve member in one direction, a second arm for moving said valve member in the other direction, a cam, a cam follower engaging said cam and carried by one of said arms, resilient means for urging said cam follower into engagement with said cam, said cam having a surface formed with an abrupt irregularity releasing said cam follower to procure instant movement of said valve member in one direction, a second cam, a second cam follower engaging said second cam and carried by said second arm, resilient means for urging said second cam follower into engagement with said second cam, said second cam having an irregularity in the surface thereof releasing said second follower to procure instant movement of said valve member in the opposite direction, and means for transferring control from one resilient means to the other.

5. In combination, a dough cutter including a duct for dough provided with an outlet through which dough is extruded, a movable valve member for said outlet movable in one direction to open said outlet to permit of the extrusion of dough therethrough and movable in the opposite direction to sever the extruded dough and close said outlet, a movable operating member for moving said valve member from one position to the other, an arm for moving said operating member in one direction, a second arm for moving said operating member in the other direction, a revoluble member, a cam rotatable with said revoluble member, a cam follower on one of said arms for engagement with said cam, a second cam, a cam follower on said second arm for engagement with said second cam, resilient means for urging said first named follower into engagement with said first named cam, and resilient means for urging said second named cam follower into engagement with said second named cam.

6. In combination, a dough cutter including a duct for dough provided with an outlet through which dough is extruded, a movable valve member for said outlet movable in one direction to open said outlet to permit of the extrusion of dough therethrough and movable in the opposite direction to sever the extruded dough and close said outlet, resilient means for instantly moving said valve member in one direction, other resilient means for instantly moving said valve member in the other direction, means for flexing both of said resilient means, and means for successively releasing said resilient means to procure first an opening of said valve member and subsequently a closing thereof.

7. In combination, a dough cutter including a duct for dough provided with an outlet through which dough is extruded, a movable valve member for said outlet movable in one direction to open said outlet to permit of the extrusion of dough therethrough and movable in the opposite direction to sever the extruded dough and close said outlet, a movable operating member for moving said valve member from one position to the other, an arm for moving said operating member in one direction, a second arm for moving said operating member in the other direction, means for holding said arms a distance apart in the locality of engagement with said operating member substantially equal to the movement of said operating member at such locality, a cam, a cam follower on one of said arms for engagement with said cam, a second cam, a cam follower on said second arm for engagement with said second cam, resilient means for urging one of said cam followers into engagement with said cam, and resilient means for urging the other cam follower into engagement with its cam.

8. In combination, a dough cutter including a duct for dough provided with an outlet through which dough is extruded, a movable valve member for said outlet movable in one direction to open said outlet to permit of the extrusion of dough therethrough and movable in the opposite direction to sever the extruded dough and close said outlet, a movable operating member for moving said valve member from one position to the other, an arm for moving said operating member in one direction, a second arm for moving said operating member in the other direction, said arms being spaced apart, a revoluble member disposed between said arms, cam means on said revoluble member, cam followers on said arms for engagement with said cam means, resilient means for moving one of said arms in a direction to urge the cam follower carried thereby into engagement with said cam means, and other resilient means acting between said arms for urging both of said cam followers into engagement with said cam means.

9. In combination, a dough cutter including a duct for dough provided with an outlet through which dough is extruded, a movable valve member for said outlet movable in one direction to open said outlet to permit of the extrusion of dough therethrough and movable in the opposite direction to sever the extruded dough and close said outlet, a movable operating member for moving said valve member from one position to the other, said operating member having an engaging member thereon, a pair of arms having engaging portions adapted to engage said engaging member, said arms being pivoted for swinging movement about pivot means situated remotely from said engaging portions whereby said engaging portions are guided for movement toward and from said engaging member, a revoluble member disposed between said arms and between said pivot means and engaging member, cam means on said revoluble member, cam followers on said arms for engagement with said cam means, resilient means for urging one of said cams into engagement with said cam means, and resilient means acting between said arms for urging both of said cam followers into engagement with said cam means.

10. In combination, a dough cutter including a duct for dough provided with an outlet through which dough is extruded, a movable valve member for said outlet movable in one direction to open said outlet to permit of the extrusion of dough therethrough and movable in the opposite direction to sever the extruded dough and close said outlet, a movable operating member for moving said valve member from one position to the other, an arm for moving said operating member in one direction, a second arm for moving said operating member in the other direction, a revoluble member, cam means on said revoluble member, cam followers on said arms for engagement with said cam means, resilient means for urging said followers into engagement with said cam means, said cam means having a plurality of irregularities therein adapted to procure a number of operations of said operating member, a cam rotatable with said revoluble member, an arm operated by said cam and a finger operated by said arm and adapted to engage the first named arm for obstructing movement thereof by said first named resilient means to hold said valve member in closed position while certain of the irregularities of said cam means pass the cam follower on said first named arm.

11. In combination, a support for attachment to a doughnut machine having a cooking receptacle, said support having an opening therein, bosses formed on said support and straddling said opening, legs detachably mounted in said bosses and extending upwardly therefrom, a collar on the uppermost portions of said legs, a receptacle for dough detachably secured to said collar at the upper portion thereof, a dough cutter disposed between said legs and secured to said collar at the lowermost portion thereof, said dough cutter registering with said opening in said support, and being adapted to discharge through said opening and into the receptacle.

ALEXANDER S. T. LAGAARD.